United States Patent
Moore et al.

(10) Patent No.: US 7,097,910 B2
(45) Date of Patent: *Aug. 29, 2006

(54) COATING COMPOSITION COMPRISING FLUOROCHEMICAL POLYETHER SILANE POLYCONDENSATE AND USE THEREOF

(75) Inventors: George G. I. Moore, Afton, MN (US); Rudolf J. Dams, Zwijndrecht (BE); Franceska M. Fieuws, Destelbergen (BE); Guido P. Piessens, Mechelen (BE)

(73) Assignee: 3M Innovative Properties Company, St. Paul, MN (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/701,748

(22) Filed: Nov. 5, 2003

(65) Prior Publication Data

US 2004/0092675 A1    May 13, 2004

Related U.S. Application Data

(63) Continuation of application No. 10/010,144, filed on Nov. 8, 2001, now Pat. No. 6,649,272.

(51) Int. Cl.
  *B32B 27/00* (2006.01)
  *B05D 3/02* (2006.01)
  *C08G 77/24* (2006.01)
  *C08L 83/00* (2006.01)

(52) U.S. Cl. .................. 428/447; 427/387; 528/32; 528/33; 528/34; 528/36; 528/39; 528/42

(58) Field of Classification Search ............... 428/429, 428/446, 447, 450; 427/384; 524/858; 528/32, 528/33, 34, 36, 39, 42
See application file for complete search history.

(56) References Cited

U.S. PATENT DOCUMENTS

| 3,810,874 A | 5/1974 | Mitsch et al. |
| 4,024,306 A | 5/1977 | Takamizawa et al. |
| 4,614,667 A | 9/1986 | Larson et al. |
| 4,687,707 A | 8/1987 | Matsuo et al. |
| 5,274,159 A * | 12/1993 | Pellerite et al. ............. 556/485 |
| 5,306,758 A | 4/1994 | Pellerite |
| 5,578,278 A | 11/1996 | Fall et al. |
| 5,644,014 A | 7/1997 | Schmidt et al. |
| 5,658,962 A | 8/1997 | Moore et al. |
| 5,739,369 A | 4/1998 | Matsumura et al. |
| 5,919,886 A | 7/1999 | Matsuda et al. |
| 5,922,787 A | 7/1999 | Kondo et al. |
| 6,054,601 A | 4/2000 | Standke et al. |
| 6,183,872 B1 * | 2/2001 | Tanaka et al. ............. 428/429 |
| 6,221,434 B1 | 4/2001 | Visca et al. |
| 6,273,348 B1 | 8/2001 | Shouji et al. |
| 6,649,272 B1 | 11/2003 | Moore et al. |
| 2004/0091720 A1 * | 5/2004 | Moore et al. ............... 428/447 |

FOREIGN PATENT DOCUMENTS

| EP | 0 166 363 B1 | 8/1991 |
| EP | 0 433 070 B1 | 1/1996 |
| EP | 0 797 111 A2 | 9/1997 |
| EP | 0 844 265 A1 | 5/1998 |
| EP | 0 933 377 A2 | 8/1999 |
| EP | 0 937 748 A2 | 8/1999 |
| EP | 0 978 524 A1 | 2/2000 |
| EP | 1 059 320 A2 | 12/2000 |
| EP | 0 738 771 B1 | 7/2001 |
| GB | 2 218 097 A | 11/1989 |
| JP | 5 331455 | 12/1993 |
| WO | WO 99/03941 | 1/1999 |
| WO | WO 99/37720 | 7/1999 |
| WO | WO 02/30848 A1 | 4/2002 |

OTHER PUBLICATIONS

"Tailoring Surfaces with Silanes", ChemTech, Dec. 1977, pp. 766-778, vol. 7.

\* cited by examiner

*Primary Examiner*—Michael J. Feely
(74) *Attorney, Agent, or Firm*—Kent S. Kokko

(57) ABSTRACT

A composition comprising the condensation product of a least one fluorochemical polyether silane compound having a polyfluoropolyether segment and at least two hydrolysable silane groups per molecule, with one or more non-fluorinated compounds having at least two hydrolysable groups per molecule, and the reaction product thereof, is disclosed. The composition provides durable water, oil and stain repellency to a substrate.

14 Claims, No Drawings

COATING COMPOSITION COMPRISING FLUOROCHEMICAL POLYETHER SILANE POLYCONDENSATE AND USE THEREOF

This application is a continuation of U.S. Pat. No. 6,649,272, the disclosure of which is herein incorporated by reference.

The present invention relates to a composition comprising the condensation product of at least one fluorochemical polyether silane compound having a polyfluoropolyether segment and at least two hydrolysable silane groups per molecule with one or more non-fluorinated compounds having at least two hydrolysable groups per molecule. The present invention also relates to the use of the composition for providing durable repellency to water, oil and stain to a substrate.

In the past, various efforts have been made to provide repellent properties to a substrate. For example, U.S. Pat. No. 4,687,707 (=EP-A-0 166 363) describes a low reflectance, transparent material having anti-soiling properties, which comprises a transparent substrate having a coating comprising a thin layer of a condensation product of a fluorine containing silicon compound having a polyfluorinated or perfluorinated carbon chain.

WO 99/03941 relates to a coating material comprising condensates of at least one compound (A) of the general formula RaMZb (a=0 to 3; b=1 to 4; a+b=3, 4), and at least one compound (B) of the general formula $R'_xMZ_y$ (x=1 to 3; y=1 to 3; x+y=3,4), wherein R is a non-hydrolysable organic group, M is an element selected from the main groups III to V or from the subgroups II to IV of the periodic table of elements, Z is a hydrolysable group, and at least one R' contains a perfluoropolyether structure separated from M by at least two atoms, and at least one R is not equal to at least one R'. The composition is used to provide oleophobic properties to substrates, such as porous polymers.

U.S. Pat. No. 5,739,369 (=EP-A-0 738 771) relates to a water-soluble surface treating agent comprising the reaction product of (A) a fluoroalkyl group—Containing alkoxysilane with (B) an amino-group—Containing alkoxysilane and optionally further with (C) an alkyl group-containing alkoxysilane. The agent is diluted with water to form a solution for treating glass and other substrates to impart thereto properties, such as water repellency.

U.S. Pat. No. 5,919,886 relates to a fluorine—Containing organo-silicon compound useful for obtaining elastomers and to room temperature curable silicon compositions containing the same compound.

U.S. Pat. No. 5,306,758 (=EP-A-0 433 070) describes fluorocarbon based, curable, crosslinkable compositions and coatings prepared therefrom that can be used to form low-surface energy release liners.

U.S. Pat. No. 5,922,787 (=EP-0 797 111) relates to a composition containing an alkoxysilane compound having a perfluoropolyether group. The composition may be used for forming an anti-fouling film.

However, our findings indicate that while some of the previously known surface coatings may be capable of providing acceptable levels of initial repellent properties, a loss of repellency is often encountered due to abrasion of the coating. Also, if non-fluorine containing components are additionally employed in the coating composition, a stepwise hydrolysis is often required (see for example U.S. Pat. No. 5,644,014), wherein in a first step a precondensation of the non-fluorinated silane is carried out and only subsequently the fluorinated silane compound may be added. If a one-step hydrolysis is carried out, often phase separation occurs thereby leading to non-homogenous coatings having insufficient repellent properties.

Accordingly, it is desirable to provide a coating composition capable of providing a highly durable water, oil and/or stain repellent coating on a substrate. In particular, it is desirable to provide a durable coating wherein the initial repellent properties are substantially maintained, even under abrading conditions. Further, the coating compositions preferably can be applied and used in an environmental friendly way and can be produced in a reliable, convenient and cost effective way.

SUMMARY OF THE INVENTION

In one aspect, the present invention provides a composition comprising the reaction product obtainable after a substantially complete condensation reaction of (A) one or more fluorochemical polyether silane compound(s) having a polyfluoropolyether segment and at least two silane groups —$Si(Y)_{3-x}(R^1)_x$ per molecule, wherein $R^1$ represents an alkyl group, Y represents a hydrolysable group and x is 0 or 1; and (B) a substantial amount of one or more non-fluorinated compounds of an element M selected from the group consisting of Si, Ti, Zr, B, Al, Ge, V, Pb, Sn and Zn and having at least two hydrolysable groups per molecule. By the term "substantially complete condensation reaction" is meant that the reaction is either complete or at least 80% of the hydrolysable groups in the mixture have disappeared, preferably at least 90%. Completion of the reaction can be monitored through the use of infrared spectroscopy and $C^{13}$—NMR.

In a further aspect, the present invention provides a method for preparation of the condensation product. In a still further aspect, the present invention also provides a method for treating a substrate, comprising the step of applying to the substrate the composition as defined above. The fluorochemical compositions can be used to treat substrates and are capable of rendering such substrates oil and water repellent and/or to provide stain repellency thereto.

The compositions are generally effective at low levels of application and have good durability. The compositions are particularly useful for rendering substrates such as ceramics, metal, polymeric substrates and glass repellent to water and/or oil.

In one embodiment, a homogeneous reaction product mixture can be obtained by simply mixing the components in a suitable solvent, in the presence of reagent water, and optionally of a catalyst. There is no need for a two-step reaction; where in a first step a precondensate of compound (B) is formed and in a second step, the fluorochemical polyether disilane (A) is added. Accordingly, the reaction product of the invention can be produced in an easy and reliable way.

By the term "homogeneous mixture" in connection with the present invention is meant that the composition is stable, for at least 24 hours, preferably 1 month, at room temperature. Some haziness may occur, however without substantial precipitation or phase separation occurring.

The term "hydrolysable group" in connection with the present invention refers to a group which either is directly capable of undergoing condensation reactions under appropriate conditions or which is capable of hydrolyzing under appropriate conditions, thereby yielding a compound, which is capable of undergoing condensation reactions. Appropriate conditions include acidic or basic aqueous conditions, optionally in the presence of a condensation catalyst.

Accordingly, the term "non-hydrolysable group" as used in the present invention refers to a group not capable of either directly undergoing condensation reactions under appropriate conditions or of hydrolyzing under the conditions listed above for hydrolyzing the hydrolyzable groups.

The term "substantial amount" of a compound as used herein refers to an amount of a compound greater than a catalytic amount of that compound necessary for promoting a certain reaction (e.g., condensation reactions). Accordingly, a composition comprising a substantial amount of that compound generally allows the compound to act as a reactant such that the resulting product is formed of at least part of that compound.

DETAILED DESCRIPTION

Component (A) comprises at least one fluorochemical polyether silane compound having a polyfluoropolyether segment and at least two silane groups —Si$(Y)_{3-x}(R^1)_x$ per molecule, wherein $R^1$ represents an alkyl group (for example a $C_1$–$C_8$, preferably $C_1$–$C_4$ primary or secondary alkyl group), Y represents a hydrolysable group and x is 0 or 1.

Preferably, component (A) is a fluorochemical polyether silane compound according to formula (I)

   (I)

wherein $R_f$ represents a multivalent polyfluoropolyether segment, Q represents an organic divalent linking group, $R^1$ represents an alkyl group (preferably containing 1 to 8, more preferably 1 to 4 carbon atoms), Y represents a hydrolysable group; R represents hydrogen or an alkyl group of 1 to 4 carbon atoms and the R groups may be the same or different, x is 0 or 1 and z is 2, 3 or 4. Preferably both R groups are hydrogens.

The hydrolysable groups Y may be the same or different and are generally capable of hydrolyzing under appropriate conditions, for example under acidic or basic aqueous conditions, such that the fluorochemical silane compound can then undergo condensation reactions. Preferably, the hydrolysable groups upon hydrolysis yield groups capable of undergoing condensation reactions, such as silanol groups.

Examples of hydrolysable groups include halide groups, such as chlorine, bromine, iodine or fluorine, alkoxy groups —OR' (wherein R' represents a lower alkyl group, preferably containing 1 to 6, more preferably 1 to 4 carbon atoms and which may optionally be substituted by one or more halogen atoms), acyloxy groups —O(CO)—R" (wherein R" represents a lower alkyl group, preferably containing 1 to 6, more preferably 1 to 4 carbon atoms, which may be optionally substituted by one or more halogen atoms), aryloxy groups —OR'" (wherein R'" represents an aryl moiety, preferably containing 6 to 12, more preferably containing 6 to 10 carbon atoms, which may be optionally substituted by one or more substituents independently selected from halogens, and $C_1$–$C_4$ alkyl groups which may optionally be substituted by one or more halogen atoms). In the above formulae R', R", and R'" may include branched structures.

Suitable hydrolysable groups also include polyoxyalkylene groups of the formula

wherein A is a divalent hydrophilic group (a) having the formula

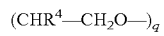

wherein q is a number having a value of 1 to 40, preferably 2 to 10, $R^4$ is hydrogen or methyl, and at least 70% of $R^4$ is hydrogen, and $R^3$ independently is hydrogen or a lower alkyl group having 1 to 4 carbon atoms, such as disclosed in U.S. Pat. No. 5,274,159, incorporated herein by reference.

Specific examples of hydrolysable groups include methoxy, ethoxy and propoxy groups, chlorine and an acetoxy group. Particularly preferred hydrolysable groups include $C_1$–$C_4$ alkoxy groups, such as methoxy and ethoxy groups.

The divalent polyfluoropolyether group $R_f$ in the above formula (I), representing the fluorinated polyether silane, can include linear, branched, and/or cyclic structures, that may be saturated or unsaturated, and containing one or more caternary oxygen atoms (i.e. one or more non-adjacent —$CF_2$— groups may be replaced by —O— groups). $R_f$ preferably is a perfluorinated group (i.e., all C—H bonds are replaced by C—F bonds). More preferably, it includes perfluorinated repeating units selected from the group of —$(C_nF_{2n}O)$—, —$(CF(Z)O)$—, —$(CF(Z)C_nF_{2n}O)$—, —$(C_nF_{2n}CF(Z)O)$—, —$(CF_2CF(Z)O)$—, and combinations thereof, wherein the repeating units generally may be randomly, blocky or alternating arranged, and optionally can include —$(C_nF_{2n})$— and —(CF(Z))- units and wherein n in a number from 1 to 12 inclusive, preferably from 1 to 4 inclusive. $R_f$ may also comprise cyclic perfluoro groups, for example cyclic —$C_6F_{10}$— groups.

In these repeating units Z is a perfluoroalkyl group, an oxygen-containing perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758 (Pellerite).

In one embodiment, approximate average structures for a divalent perfluoropolyether group include —$CF_2O(CF_2O)_m(C_2F_4O)_pCF_2$—, wherein an average value for m is 0 to about 50 and an average value for p is 0 to about 50, with the proviso that both m and p are not simultaneously 0, —$CF(CF_3)$—$(OCF_2CF(CF_3))_pO$—$R_f'$—$O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein $R_f'$ is a divalent, perfluoroalkylene group containing one or more carbons and optionally catenary O or N. The values of m and p in these approximate average structures can vary. Preferably, an average value of m is within a range of about 1 to about 50, and an average value of p is within a range of about 3 to about 40. As these are polymeric materials, such compounds exist as mixtures upon synthesis, which are suitable for use. The repeat units generally may be positioned in a random, blocked or alternating arrangement.

As synthesized, these structures typically include a mixture of polymeric units. The approximate average structure is the approximate average of the mixture of structures. Further, the distribution of perfluorinated repeating units may be regular or random.

The divalent linking group Q may be the same or different and can include linear, branched, or cyclic structures, that may be saturated or unsaturated, and preferably contains 1 to 15 atoms. The group Q can contain one or more heteroatoms (e.g., oxygen, nitrogen, or sulfur) and/or one or more functional groups (e.g., carbonyl, amide, urethane or sulfonamide). It can also be substituted with one or more halogen atoms (preferably, fluorine atoms), although this is less desirable, as this might lead to instability of the compound. The divalent linking group Q preferably is substantially stable against hydrolysis.

For example, Q may be a saturated or unsaturated hydrocarbon group typically including 1 to 15 carbons atoms. Preferably Q is a linear hydrocarbon group preferably containing 1 to 10 carbon atoms, and optionally containing 1 to 4 heteroatoms and/or 1 to 4 functional groups, and more preferably, containing at least one functional group.

Suitable linking groups Q include the following structures in addition to a covalent bond. For the purposes of this list, each k is independently an integer from 0 to about 20, k' is independently an integer from 0 to 20, preferably from 2 to 12 and most preferably from 2 to 6, $R_1'$ is hydrogen, phenyl, or alkyl of 1 to about 4 carbon atoms, and $R_2'$ is alkyl of 1 to about 20 carbon atoms

| | |
|---|---|
| —$SO_2NR_1'(CH_2)_kO(O)C$— | —$CONR_1'(CH_2)_kO(O)C$— |
| —$(CH_2)_kO(O)C$— | —$CH_2CH(OR_2')CH_2O(O)C$— |
| —$(CH_2)_kC(O)O(CH_2)_{k'}$— | —$(CH_2)_kSC(O)$— |
| —$(CH_2)_kO(CH_2)_kO(O)C$— | —$(CH_2)_kS(CH_2)_kO(O)C$— |
| —$(CH_2)_kSO_2(CH_2)_kO(O)C$— | —$(CH_2)_kS(CH_2)_kOC(O)$— |
| —$(CH_2)_kSO_2NR_1'(CH_2)_kO(O)C$— | —$(CH_2)_kSO_2$— |
| —$SO_2NR_1'(CH_2)_kO(CH_2)_{k'}$— | —$SO_2NR_1'(CH_2)_k$— |
| —$(CH_2)_kO(CH_2)_kC(O)O(CH_2)_{k'}$— | —$(CH_2)_kSO_2NR_1'(CH_2)_kC(O)O(CH_2)_{k'}$— |
| —$(CH_2)_kSO_2(CH_2)_kC(O)O(CH_2)_{k'}$— | —$CONR_1'(CH_2)_kC(O)O(CH_2)_{k'}$— |
| —$(CH_2)_kS(CH_2)_kC(O)O(CH_2)_{k'}$— | —$CH_2CH(OR_2')CH_2C(O)O(CH_2)_{k'}$— |
| —$SO_2NR_1'(CH_2)_kC(O)O(CH_2)_{k'}$— | —$(CH_2)_kO(CH_2)_{k'}$— |
| —$OC(O)NR'(CH_2)_k$— | —$(CH_2)_kNR_1'$— |
| —$C_kH_{2k}$—$OC(O)NH$— | —$C_kH_{2k}$—$NR_1'C(O)NH(CH_2)_{k'}$—, |
| —$(CH_2)_kNR_1'C(O)O(CH_2)_{k'}$—, and | —$(CH_2)_k$— |

Preferred linking groups Q are —$C(O)NH(CH_2)_2$— and —$OC(O)NH(CH_2)_2$—.

Conveniently, the compounds of formula I used, generally have an average molecular weight of at least about 650, and preferably, at least about 1000. It will be understood, with respect to the description of formula I, that the composition comprises mixtures of compounds and therefore mixtures of molecular weights.

Examples of preferred fluorinated disilanes include, but are not limited to, the following approximate average structures:

$(R^1)_x(Y)_{3-x}Si$—$CR_2$-$QCF_2O(CF_2O)_m(C_2F_4O)_pCF_2Q$-$CR_2$—$Si(Y)_{3-x}(R^1)_x$, $(R^1)_x(Y)_{3-x}Si$—$CR_2$-$QCF(CF_3)O[CF_2CF(CF_3)]_m(CF_2)_pO[CF(CF_3)CF_2O]_nCF(CH_3)Q$-$CR_2$—$Si(Y)_{3-x}(R^1)_x$ $(R^1)_x(Y)_{3-x}Si$—$CR_2$-$Q$ $CF_2O(C_2F_4O)_pCF_2Q$-$CR_2$—$Si(Y)_{3-x}(R^1)_x$, and $(R^1)_x(Y)_{3-x}Si$—$CR_2$-$Q$ $(CF_2)_3O(C_4F_8O)_p(CF_2)_3Q$-$CR_2$—$Si(Y)_{3-x}(R^1)_x$, Preferably, in each fluorinated polyether silane, Q contains a nitrogen atom. More preferably, at least one Q-$CR_2$—$Si(Y)_{3-x}(R^1)_x$ group per molecule is —$C(O)NH(CH_2)_3Si(OR)_3$ or —$OC(O)NH(CH_2)_3Si(OR)_3$ (wherein R is methyl, ethyl, polyethyleneoxy or mixtures thereof).

The compounds of formula (I) can be synthesized using standard techniques. For example, commercially available or readily synthesized perfluoropolyether esters (or function derivative thereof) can be combined with a functionalized alkoxysilane, such as a 3-aminopropylalkoxysilane, according to U.S. Pat. No. 3,810,874 (Mitsch et al.). It will be understood that functional groups other than esters may be used with equal facility to incorporate silane groups into a perfluoropolyether.

In accordance with a particular embodiment of the present invention, such perfluoropolyether diesters may be prepared through direct fluorination of a hydrocarbon polyether diester. Direct fluorination involves contacting the hydrocarbon polyether diester with $F_2$. Accordingly, the hydrogen atoms on the hydrocarbon polyether diester will be replaced with fluorine atoms thereby generally resulting in the corresponding perfluoropolyether diester. Direct fluorination methods are disclosed in, for example, U.S. Pat. Nos. 5,578,278 and 5,658,962, which are incorporated herein by reference.

Examples of intermediates suitable for use in the preparation of fluorochemical polyether silanes may be represented by the general formula $R_f$—$X_z$, wherein $R_f$ is as previously defined for Formula I and z is 2, 3 or 4. A particularly useful intermediate may be represented by the general formula $X(CF_2)_n$—O-$C_{n'}F_{2n'}$—O—$(CF_2)_nX$ where n is in the range of 1 to 6, and preferably in the range of 1 to 3; n' is in the range of 5 to 12, and preferably in the range of 5 to 7, X is selected from the group consisting of —COOH, —$COOM_{1/v}$, —$COONH_4$, —COOR, —$CH_2OH$, —COF, —COCl, —COR, $CONR'R'$, —$CH_2NH_2$, —$CH_2NCO$, —CN, —$CH_2OSO_2R$, —$CH_2OCOR$, —$OC(O)CH_3$, —$CH_2OCOCR'$=$CH_2$, —$CONH(CH_2)_mSi(OR)_3$, and —$CH_2O(CH_2)_mSi(OR)_3$;

where M is a metal atom having a valence "v" of 1 to 4, each R is independently selected from the group consisting of alkyl groups having from 1 to 14 carbon atoms, fluoroalkyl groups having from 1 to 14 carbon atoms, aryl groups having from 6 to 10 ring-carbon atoms, and heteroatom-containing groups having from 1 to 14 carbon atoms, and m is an integer in the range from 1 to 11; R' is independently H or R with the proviso R' is not a fluoroalkyl group.

Specific structures are exemplified by:

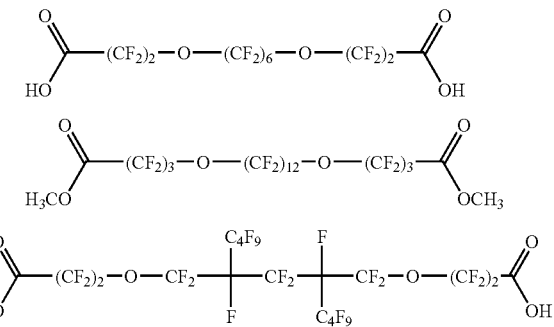

-continued

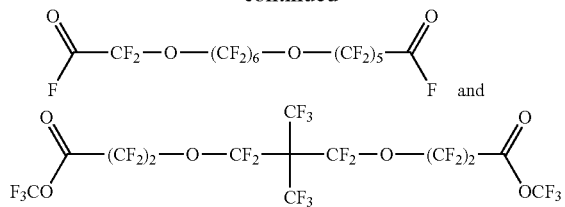

It will be understood with respect to the above novel structures, that other functional groups may be substituted for those depicted. For examples, the —CO$_2$H group may be substituted by —COOM$_{1/v}$, —COONH$_4$, —COOR, —CH$_2$OH, —COF, —COCl, —COR, CONR'R', —CH$_2$NH$_2$, —CH$_2$NCO, —CN, —CH$_2$OSO$_2$R, —CH$_2$OCOR, —OC(O)CH$_3$, —CH$_2$OCOCR'=CH$_2$, —CONH(CH$_2$)$_m$Si(OR)$_3$, and —CH$_2$O(CH$_2$)$_m$Si(OR)$_3$ as previously described.

An additional embodiment is a composition comprising

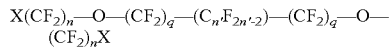

where n is in the range of 1 to 6, and preferably in the range of 1 to 3; C$_n$F$_{2n'-2}$ represents a cycloalkylene moiety where n' is in the range of 5 to 12, and preferably in the range of 6 to 8, X is selected from the group consisting of —COOH, —COOM$_{1/v}$, —COONH$_4$, —COOR, —CH$_2$OH, —COF, —COCl, —COR', CONR'R', —CH$_2$NH$_2$, —CH$_2$NCO, —CN, —CH$_2$OSO$_2$R, —CH$_2$OCOR, —OC(O)CH$_3$, —CH$_2$OCOCR'=CH$_2$, —CONH(CH$_2$)$_m$Si(OR)$_3$, —CH$_2$O(CH$_2$)$_m$Si(OR)$_3$; where M is a metal atom having a valence "v" of 1 to 4, each R is independently selected from the group consisting of alkyl groups having from 1 to 14 carbon atoms, fluoroalkyl groups having from 1 to 14 carbon atoms, aryl groups having from 6 to 10 ring-carbon atoms, and heteroatom-containing groups having from 1 to 14 carbon atoms, q is 0 or 1, and m is an integer in the range from 1 to 11; R' is independently H or R with the proviso R' is not a fluoroalkyl group.

Specific perfluorinated cycloalkylene-containing structures are exemplified by:

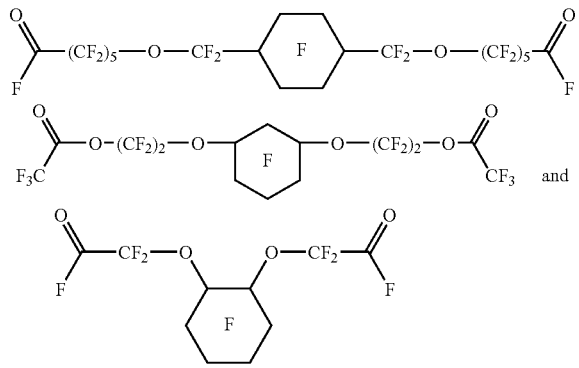

In an alternative method, perfluoropolyetherdiols can be reacted with a functionalized alkoxysilane, such as 3-trimethoxysilylpropylisocyanate. Modifications of this method are described in the Examples. Such materials may or may not need to be purified before use in a treatment composition.

In the present invention, mixtures of compounds (A) and/or (B) may be used.

Component (B) as used in the present invention comprises one or more non-fluorinated compounds of an element M selected from the group consisting of Si, Ti, Zr, B, Al, Ge, V, Pb, Sn and Zn having at least two hydrolysable groups per molecule. Preferably, the hydrolysable groups are directly bonded to the element M.

In one embodiment of the present invention, component (B) comprises a compound according to the formula (II)

$$(R^2)_q M(Y^1)_{p-q} \qquad (II)$$

wherein R$^2$ represents a non-hydrolysable group, M represents an element of valency p+q, selected from the group consisting of Si, Ti, Zr, B, Al, Ge, V, Pb, Sn and Zn, p is 3 or 4 depending on the valence of M, q is 0, 1 or 2, and Y$^1$ represents a hydrolysable group.

The hydrolysable groups present in component (B) may be the same or different and are generally capable of hydrolyzing under appropriate conditions, for example under acidic or basic aqueous conditions, such that component (B) can undergo condensation reactions. Preferably, the hydrolysable groups upon hydrolysis yield groups capable of undergoing condensation reactions, such as hydroxyl groups.

Typical and preferred examples of hydrolysable groups include those as described with respect to component (A). Preferably, component (B) includes tetra-, tri- or dialkoxy (preferably containing 1 to 4 carbon atoms) compounds.

The non-hydrolysable groups R$^2$ may be the same or different and are generally not capable of hydrolyzing under the conditions listed above. For example, the non-hydrolysable groups R$^2$ may be independently selected from a hydrocarbon group, for example a C$_1$–C$_{30}$ alkyl group, which may be straight chained or branched and may include one or more aliphatic, cyclic hydrocarbon structures, a C$_6$–C$_{30}$ aryl group (optionally substituted by one or more substituents selected from halogens and C$_1$–C$_4$ alkyl groups), or a C$_7$–C$_{30}$ aralkyl group.

In one embodiment the non-hydrolysable groups R$^2$ are independently selected from a hydrocarbon group, for example a C$_1$–C$_{30}$ alkyl group and a C$_6$–C$_{20}$ aryl group (optionally substituted by one or more substituents selected from halogens and C$_1$–C$_4$ alkyl groups).

Preferred compounds (B) include those in which M is Ti, Zr, Si and Al. Representative examples of component (B) include tetramethoxysilane, tetra ethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate and the like. More preferred compounds include C$_1$–C$_4$ alkoxy derivatives of Si, Ti and Zr. Particularly preferred compounds (B) include tetraethoxysilane. Single compounds or mixtures of compounds (B) may be used.

Optionally, the composition may comprise one or more crosslinking agents (C), in order to further increase the durability of the coating. Component (C) may be selected from compounds with additional functionality from those of components (A) and (B). For example, component (C) may comprise a compound of an element M$^1$ that is selected from the group consisting of Si, Ti, Zr, B, Al, Ge, V, Pb, Sn and Zn having at least one hydrolysable group and at least one reactive functional group per molecule that is capable of engaging in a crosslinking reaction. Preferably, said at least one hydrolysable group is directly bonded to the element $M^1$.

Suitable and preferred hydrolysable groups include those groups mentioned with respect to component (A). If component (C) includes more than one hydrolysable groups, these may be the same or different. Particularly preferred hydrolysable groups are selected from $C_1$–$C_4$ alkoxy groups, such as methoxy, ethoxy, iso- and (preferably) n-propoxy, or iso- and (preferably) n-butoxy groups.

The reactive functional group is a group which is capable of engaging in a crosslinking reaction so as to provide further crosslinking functionality to the polycondensation product that can be obtained from components (A), (B) and (C). The crosslinking reaction may involve for example irradiation, heating or a combination thereof. If component (C) includes more than one reactive functional groups, these groups may be the same or different. Of these, free radically polymerizable groups, such as vinyl, acrylate or methacrylate groups, are particularly preferred reactive functional groups.

A preferred crosslinking agent can be represented by formula (IV):

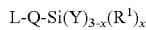

$$L\text{-}Q\text{-}Si(Y)_{3-x}(R^1)_x$$

wherein

L represents a reactive functional group that may react by condensation or addition reactions such as an amino group, an epoxy group, a mercaptan or an anhydride group or by free-radical polymerization; and Q, Y and $R^1$ are as described for formula I, and x is 0, 1 or 2.

For formula V, preferably Q is an alkylene (preferably containing 1 to 10, more preferably containing 1 to 6 carbon atoms), an arylene (preferably containing 6 to 20 carbon atoms which may be substituted by one or more $C_1$–$C_4$ alkyl groups, halogen atoms or mixtures thereof), an oxyalkylene group of the formula (—O—R—)$_n$, wherein R is independently selected from a divalent, straight chained or branched lower alkyl group (preferably containing 1 to 6 carbon atoms) and n is an integer from 1 to 20.

For formula IV, preferably $R^1$ independently represents an alkyl group, preferably a $C_1$–$C_8$ alkyl group (such as methyl, ethyl or propyl) or an $C_1$–$C_8$ alkyl group containing a cyclic hydrocarbon structure (such as cycloalkyl such as cyclohexyl or cyclopentyl), an aryl group (preferably containing 6 to 20 carbon atoms which may optionally be substituted by one or more $C_1$–$C_4$ alkyl groups or halogens or mixtures thereof, such as phenyl), an alkylaryl group (preferably containing 7 to 12 carbon atoms) or an aralkyl group (preferably containing 7 to 12 carbon atoms).

For formula IV, Y is hydrolysable group. Suitable and preferred examples of hydrolysable groups include those groups as mentioned with respect to component (A), formula I.

Particularly preferred hydrolysable groups include alkoxy groups (preferably containing 1 to 4 carbon atoms), such as methoxy and ethoxy groups.

Particularly preferred reactive compounds according to formula (IV), in which the reactive functional group L is one that reacts by addition or condensation reactions, include epoxypropyltrimethoxysilane, bis(3-aminopropyltrimethoxysilyl)amine and aminopropyltrimethoxysilane.

Alternatively L may be a reactive functional group that is a free radically polymerizable group that typically contains an ethylenically unsaturated group capable of undergoing a free radical polymerization. Suitable free radically polymerizable groups L include, for example, moieties derived from vinyl ethers, vinyl esters, allyl esters, vinyl ketones, styrene, vinyl amide, acrylamides, maleates, fumarates, acrylates and methacrylates. Of these, the esters and amides of alpha, beta unsaturated acids, such as the acrylates and methacrylates are preferred.

Where L is a free radically polymerizable group the organic divalent linking group Q may contain from 1 to about 20, preferably from 1 to 10 carbon atoms. Q can optionally contain oxygen, nitrogen, or sulfur-containing groups or a combination thereof. Examples of suitable linking groups Q include straight chain, branched chain or cyclic alkylene (preferably containing 2 to 20 carbon atoms), arylene (preferably containing 6 to 20 carbon atoms), aralkylene (preferably containing 7 to 20 carbon atoms), oxyalkylene, carbonyloxyalkylene, oxycarboxyalkylene, carboxyamidoalkylene, urethanylenealkylene, ureylenealkylene and combinations thereof.

Preferred linking groups Q for Formula IV are selected from the group consisting of alkylene (preferably containing 2 to 20, more preferably 2 to 10 carbon atoms), oxyalkylene (preferably containing 2 to 20 carbon atoms and 1 to 10 oxygen atoms) and carbonyloxyalkylene (preferably containing 3 to 20 carbon atoms).

Examples of compounds according to formula (IV), wherein L is a free radically polymerizable group include vinyltrichlorosilane, vinyltrimethoxysilane, vinyltriethoxysilane and alkoxysilane functionalised acrylates or methacrylates, such as methacryloyloxypropyl trimethoxysilane.

The presence of such reactive functional groups, preferably reactive unsaturated groups in the corresponding polycondensates is advantageous in that following the coating of the composition onto a substrate a two-fold curing can be carried out, i.e. a thermal or photochemically induced linking of the unsaturated organic radicals through radical polymerization and a thermal completion of the polycondensation (e.g. by elimination of water from groups M—OH still present). In the case an unsaturated compound is used, additionally a catalyst should typically be present for the thermal and/or photochemically induced curing of the coating composition applied onto a suitable substrate. Particularly preferred is the addition of a photopolymerization initiator. Such initiators are commercially available and include e.g. Irgacure® 184 (1-hydroxycyclohexyl phenyl ketone), Irgacure®500 (1-hydroxycyclohexyl phenyl ketone, benzophenone), and other photo-initiators of the Irgacure®-type available from Ciba-Geigy; Darocur®-type photo-initiators, available from Merck, benzophenone and the like.

Examples of optionally employed thermal initiators are known to those skilled in the art and include, among others, organic peroxides in the form of diacyl peroxides, peroxydicarbonates, alkyl peresters, dialkyl peroxides, perketals, ketone peroxides and alkyl hydroperoxides. Specific examples of such thermal initiators are dibenzoyl peroxide, tert-butyl perbenzoate and azobisisobutyronitrile. These initiators are added to the coating composition in amounts known to one skilled in the art. Typically the initiator will be added in an amount between 0.1 and 2% by weight, based on the amount of crosslinking agent.

The compositions may further contain additives that provide the coating with additional properties, such as antimicrobial properties. Examples include [$C_{18}H_{37}N$ ($CH_3$)$_2$ ($CH_2$)$_3Si(OCH_3)_3$]$^+Cl^-$. However, the addition of ionic additives is preferably kept below about 10% by weight, in order not to adversely affect the water repellency properties of the composition.

The reaction product comprised in the composition of the present invention is obtainable by reacting components (A), (B), and optionally (C). Typically, the reaction product is a polycondensation product. Suitable reacting steps include at least partially condensation.

The polycondensation reaction is conveniently carried out by mixing the starting components in an organic solvent preferably at room temperature, in the presence of sufficient water to effect hydrolysis of the hydrolysable groups. Preferably, the amount of water will be between 0.1 and 20% by weight of the total composition, more preferably between 1 and 10% by weight. In addition to water, an organic or inorganic acid or base catalyst should preferably be used.

It is preferred that the weight ratio of compounds (A) to compounds (B) in the preparation of the reaction product is 1:1 to 1:20 and particularly preferred 1:1 to 1:10. The composition to prepare the reaction product comprises a substantial amount of component (B), i.e. an amount greater than a catalytic amount. Typically, component (B) comprises more than 10 weight percent and more preferably more than 25 weight percent based on the total weight of the components used. In a particularly preferred embodiment, component (B) comprises more than 50 weight percent based on the total weight of the components used. Compound (C) can be used between 0 and 50%, preferably between 0 and 35% by weight, based on the total weight of the components used.

While the benefits of reacting components A and B (optionally with C) extend over a wide range of compositions, good initial repellency is achieved for coatings despite relatively low levels of the fluorochemical polyether silane (component A) involved in producing the reaction product. Therefore a preferred composition of this invention comprises the relatively expensive fluorosilane at 5–20% wt. %, giving an economic advantage to the compositions of this invention over other fluorinated coatings. Additionally, compositions obtained from 5–20 wt. % component A were quite surprisingly more durable in maintaining repellency after abrasion of a coated surface.

A homogeneous reaction mixture can be obtained by mixing the components in solvent, in the presence of water, and optionally an acid or base catalyst. In particular, there is no need for a two step reaction, where in a first step a precondensate of compound (B) is formed and in a second step, the fluorochemical polyether disilane is added. Upon mixing, a homogenous mixture is obtained wherein substantially no phase separation occurs.

Organic acid catalysts include acetic acid, citric acid, formic acid, triflic acid, perfluorobutyric acid and the like. Examples of inorganic acids include sulphuric acid, hydrochloric acid and the like. Examples of useful base catalysts include sodium hydroxide, potassium hydroxide and triethylamine. The acid or base catalyst will generally be used in amounts between about 0.01 and 10%, more preferably between 0.05 and 5% by weight of the total composition.

The composition of the present invention may include one or more organic solvents. The organic solvent or blend of organic solvents used must be capable of dissolving a mixture of compounds (A), (B) and optionally (C) and the fluorinated polycondensate formed after reaction. Preferably, the organic solvent or blend of organic solvents used is capable of dissolving at least 0.01% of the fluorochemical polycondensate. Furthermore, the solvent or mixture of solvents preferably has a solubility for water of at least 0.1%, preferably 1% by weight and a solubility for the acid or base catalyst of at least 0.01%, preferably 0.1% by weight. If the organic solvent or mixture of organic solvents do not meet these criteria, it may not be possible to obtain a homogeneous mixture of the fluorinated polycondensate, solvent(s), water and catalyst.

Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether. Particularly preferred solvents include ethanol and acetone.

Fluorinated solvents may be used in combination with the organic solvents in order to improve solubility of the starting compounds and/or the fluorochemical polycondensate. Such fluorinated solvents will generally not be suitable for use on their own because they will generally not meet the requirements of solubility for water and acid or base unless they additionally contain hydrophilic groups such as $CF_3CH_2OH$.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

It will further be appreciated by one skilled in the art that the preparation of fluorochemical polycondensates according to the present invention results in a mixture of compounds. A condensation sequence is described by Arkles (CHEMTECH (1977), v. 7 pp 766–78).

The composition comprising the fluorinated polycondensates of the present invention is generally applied to the substrate in amounts sufficient to produce a coating that is water and oil repellent. This coating can be extremely thin, e.g. 1 to 50 molecular layers, though in practice a useful coating may be thicker.

Suitable substrates that can be treated in a particularly effective way with the fluorinated polycondensate mixture of this invention include substrates having a hard surface that preferably has groups capable of reacting with the fluorinated polycondensate. Particularly preferred substrates include ceramics, glass, metal, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), and wood. Various articles can be effectively treated with the fluorochemical solution of the present invention to provide a water and oil repellent coating thereon. Examples include ceramic tiles, bathtubs or toilets, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

To effect the treatment of a substrate, the fluorochemical polycondensate, preferably in the form of a solvent composition as disclosed above, is applied to the substrate. The amount of fluorochemical polycondensate to be coated on the substrate will generally be that amount sufficient to produce a coating which is water and oil repellent, such a coating having at 20° C. a contact angle with distilled water of at least 80°, and a contact angle with n-hexadecane of at least 40°, measured after drying and curing of the coating.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

The coating composition is typically a relatively diluted solution, containing between 0.01 and 5 percent by weight of the fluorochemical polycondensate, more preferably, between 0.03 and 3 percent by weight of the fluorochemical polycondensate, and most preferably, between 0.05 and 2 percent by weight of the fluorochemical polycondensate. In accordance with a preferred embodiment, compositions for application to a substrate are prepared by diluting a concentrate comprising a solution of at least 25% by weight of a fluorochemical polycondensate in an organic solvent, by adding to the concentrate an organic solvent or mixture of solvents.

A wide variety of coating methods can be used to apply a composition of the present invention, such as brushing, spraying, dipping, rolling, spreading, and the like. A preferred coating method for application of a fluorochemical polycondensate of the present invention includes spray application. A substrate to be coated can typically be contacted with the treating composition at room temperature (typically, about 20° C. to about 25° C.). Alternatively, the mixture can be applied to substrates that are preheated at a temperature of for example between 60° C. and 150° C. This is of particular interest for industrial production, where e.g. ceramic tiles can be treated immediately after the baking oven at the end of the production line. Following application, the treated substrate can be dried and cured at ambient or elevated temperature, e.g. at 40° to 300° C. and for a time sufficient to dry and cure. Alternatively, in addition with a thermal treatment, the coating composition may be cured by irradiation (e.g. by means of UV-irradiators, a laser, etc.) in a manner known per se, depending on the type and presence, respectively of an initiator. The process may also require a polishing step to remove excess material.

Preferably, the obtained coating on the substrate is cured, generally at an elevated temperature of 40 to 300° C. This curing step can be done at the beginning (application of the composition to a hot substrate) or at the end of the application process. In an alternative method, the coating can be cured by photochemical activation of materials represented in formula (IV).

The following examples further illustrate the invention without the intention however to limit the invention thereto. All parts are by weight unless indicated otherwise.

1. Synthesis of Fluorinated Polyether Disilanes

A. Fluoropolyetherdisilane FES-1:

FES-1 was prepared by reacting perfluoropolyetherdiester $CH_3OC(O)CF_2O(CF_2O)_{9-11}(CF_2CF_2O)_{9-11}CF_2C(O)OCH_3$ (with average molecular weight of about 2000), commercially available from Ausimont, Italy, under the trade designation Fomblin™ Z-DEAL, with 3-aminopropyltrimethoxysilane, available from Aldrich Co., Milwaukee, Wis., as taught in U.S. Pat. No. 3,810,874 (Mitsch et al.), table 1, line 6. The exothermic reaction proceeded readily at room temperature, simply by mixing the starting materials. The progress of the reaction was monitored by infrared analysis.

B. Hexafluoropropyleneoxide Diurethanedisilane FES-2:

FES-2 was prepared by reacting a perfluoropolyetherdiol $(HOCH_2CF(CF_3)O(CF(CF_3)CF_2O)_x(CF_2)_4O(CF(CF_3)CF_2O)_yCF(CF_3)CH_2OH$ (with average molecular weight of about 1300; x+y is about 6–7) with two equivalents of 3-trimethoxysilylpropylisocyanate in ethylacetate, at 80° C. during 16 hours under nitrogen atmosphere and in the presence of dibutyltindilaurate. After the reaction was completed, as indicated by IR-analysis, the ethylacetate was evaporated.

C. Preparation of FES-3:

FES-3 was prepared by reacting Fomblin Z-DEAL with 2 equivalents of bis(3-(trimethoxysilyl)propyl)amine, available from Aldrich, Milwaukee, Wis. as described in U.S. Pat. No. 3,810,874. The reaction was performed under nitrogen atmosphere at 80° C. for 6 hrs. Reaction progress reaction was monitored by IR analysis.

D. Preparation of FES-4:

FES-4 was prepared by reacting a mixture of HFPO-oligomers with formula $CF3CF2CF20(CF(CF3)CF20)n)CF(CF3)COOCH3$ (with n ~5), with one equivalent of bis(3-(trimethoxysilyl)propyl)amine, available from Aldrich, Milwaukee, Wis. as described in U.S. Pat. No. 3,810,874. The reaction was carried out under nitrogen at 80° C. for 6 hrs. Reaction progress was monitored by gas chromatographic analysis.

2. Synthesis of Fluorochemical Polycondensate FESG-1

Several fluorochemical polycondensates as given in table 1 were prepared similar to the synthesis of FESG-1:

In a three-necked flask of 250 ml, fitted with a condenser, stirrer and thermometer, were placed 10 g of FES-1, 10 g TEOS (tetraethoxysilane; available from Aldrich Co., Milwaukee, Wis.), 20 g ethanol, 2.0 g DI—$H_2O$ and 1.0 g acetic acid. The clear mixture was stirred at room temperature for 16 hrs. Conversion of alkoxy silane groups was determined, after solvent evaporation, using infrared and $C^{13}$—NMR analysis. Conversion was about 96%. The slightly hazy reaction mixture was then diluted to 0.1% fluorochemical solids in ethanol.

The preparation of the fluorochemical polycondensates FESG-5 and FESG-8 were prepared in a similar manner to that noted above with the exception that 0.1 g of DI—$H_2O$ was added instead of 2.0 g of DI—$H_2O$.

TABLE 1

Composition of fluorochemical polycondensates

| FESG | Compounds | Weight ratio |
|---|---|---|
| FESG-1 | FES-1/TEOS | 1/1 |
| FESG-2 | FES-1/TEOS/Octadecyltrimethoxysilane | 2/2/1 |
| FESG-3 | FES-1/TEOS/aminopropyltrimethoxysilane | 2/2/1 |
| FESG-4 | FES-1/TEOS/$(C_{18}H_{37}N^+CH_3)_2(CH_2)_3Si(OCH_3)_3Cl^-I$ | 10/10/1 |
| FESG-5 | FES-1/tetraethoxyzirconate | 1/1 |
| FESG-6 | FES-1/TEOS/aminopropyltrimethoxysilane | 1/1/1 |
| FESG-7 | FES-1/TEOS | 1/10 |
| FESG-8 | FES-1/tetraisopropyloxytitanate | 1/1 |
| FESG-9 | FES-2/TEOS | 1/1 |
| FESG-10 | FES-2/TEOS/epoxypropyltrimethoxysilane | 2/2/1 |
| FESG-11 | FES-3/TEOS | 1/1 |
| FESG-12 | FES-4/TEOS | 1/1 |

Substrates

The fluorochemical polycondensate mixtures according to the invention were tested on various substrates as given below:

| Substrate | Supplier |
|---|---|
| White glazed wall tiles | Villeroy and Boch, Germany |
| Polymethylmethacrylate (PMMA) sheet | NUDEC, Spain |
| Linoleum | Forbo-Krommerie, Netherlands |
| Enamel plate | ROCA, Spain |
| Epoxy powder coating | Ruhr Pulverlack GmbH, Germany |
| Wood | BRICO, Belgium |
| Chromated steel | Ideal Standard, Germany |

Methods of Testing

Contact Angles

The treated substrates were tested for their contact angles versus water (W) and n-hexadecane (O) using an Olympus TGHM goniometer. The contact angles were measured before (initial) and directly after abrasion (abrasion), unless otherwise indicated. The values are the mean values of 4 measurements and are reported in degrees. The minimum measurable value for a contact angle was 20. A value <20 meant that the liquid spread on the surface.

Abrasion Test

The treated substrates were abraded using an AATCC Crockmeter, 20 cycles using sandpaper nr. 600 (available from 3M). Alternatively, abrasion testing was accomplished using an Erichsen cleaning machine, 3M High Performance Cloth (available from 3M) and CIF cleaner (available from Lever), using 40 cycles.

EXAMPLES

Examples 1 to 12 and Comparative Examples C-1 to C-3

In examples 1 to 12, 0.1% fluorochemical polycondensate mixtures prepared according to the general procedure, were sprayed onto white Villeroy & Boch tiles, kept at room temperature, followed by curing at 150° C. during 30 minutes. After cooling to 50° C., excess product was polished off with a paper wipe. Contact angles were measured before and after abrasion with an Erichsen cleaning machine. Comparative example C-1 was made with a mixture of a fluorochemical silane composition (according to GB 2 218 097, example 25) and TEOS in a weight ratio 1/1. Comparative example C-2 was made with a mixture of Ausimont MF 407, a perfluoropolyether monosilane, available from Ausimont and TEOS in a ratio weight 1/1. Comparative example C-3 was made with a mixture, prepared according to U.S. Pat. No. 6,054,601, example 1. The results are given in table 2.

TABLE 2

Contact angles of wall tiles treated with fluorochemical polycondensate mixtures.

| Ex | Fluorochemical polycondensates | Initial Water | Initial n-hexadecane | After abrasion Water | After abrasion n-hexadecane |
|---|---|---|---|---|---|
| 1 | FESG-1 | 108 | 65 | 90 | 52 |
| 2 | FESG-2 | 102 | 58 | 85 | 45 |
| 3 | FESG-3 | 109 | 58 | 95 | 54 |
| 4 | FESG-4 | 98 | 57 | 85 | 45 |
| 5 | FESG-5 | 104 | 63 | 85 | 54 |
| 6 | FESG-6 | 105 | 60 | 85 | 47 |
| 7 | FESG-7 | 105 | 60 | 92 | 55 |
| 8 | FESG-8 | 100 | 60 | 85 | 52 |
| 9 | FESG-9 | 106 | 62 | 80 | 45 |
| 10 | FESG-10 | 103 | 60 | 85 | 47 |
| 11 | FESG-11 | 105 | 65 | 90 | 50 |
| 12 | FESG-12 | 100 | 58 | 80 | 45 |
| C-1 | GB 2 218097, ex 25/TEOS 1/1 | 100 | 65 | 58 | 32 |
| C-2 | MF407/TEOS 1/1 | 93 | 52 | 55 | 20 |
| C-3 | Example 1 in U.S. Pat. No. 6,054,601 | 95 | 50 | 50 | 20 |

The results indicated that tiles with high oil- and water-repellency could be made by using fluorochemical polycondensate compositions according to the invention. High contact angles were measured, initially, but especially also after abrasion, indicating that highly durable coatings were made. To the contrary, the comparative examples did not meet the requirements for oil and/or water repellency after abrasion.

Examples 13 to 18

In examples 13 to 18, different substrates, which were kept at room temperature, were treated with FESG-1 by spray application. The treated substrates were dried at 80° C. for 30 min. After cooling to 40° C., the excess product was polished off using a paper wipe. Abrasion test was done using the AATCC Crockmeter. The contact angles of untreated substrates were recorded as well as the contact angles of the treated substrates, before and after abrasion. The results are given in table 3.

TABLE 3

Contact angles of substrates treated with fluorochemical polycondensate mixtures.

| | | Contact angles (°) | | | | | |
|---|---|---|---|---|---|---|---|
| | | Untreated initial | | FESG-1 initial | | FESG-1 Abrasion | |
| Ex | Substrate | W | O | W | O | W | O |
| 13 | Linoleum | 92 | <20 | 120 | 60 | 108 | 55 |
| 14 | PMMA | 70 | <20 | 90 | 60 | 78 | 45 |
| 15 | Epoxy | 65 | <20 | 92 | 62 | 85 | 55 |
| 16 | Wood | <20 | <20 | 120 | 56 | 65 | 43 |
| 17 | Enamel | 40 | <20 | 96 | 58 | 90 | 50 |
| 18 | Chromated steel | 72 | <20 | 95 | 60 | 85 | 50 |

The results in table 3 show that the application of a 0.1% mixture of fluorochemical polycondensate, according to the invention, improved the water and oil repellency of the different substrates considerably. In all cases, high durability of the treatment was observed.

What is claimed is:

1. A composition comprising the reaction product obtained after a substantially complete condensation reaction of:
   A. at least one fluorochemical polyether silane compound of the formula:

$R_f$—[Q-CR$_2$Si(Y)$_{3-x}$(R$^1$)$_x$]$_z$ wherein $R_f$ represents a multivalent polyfluoropolyother segment, Q represents an organic divalent linking group, $R^1$ represents a $C_1$–$C_8$ alkyl group, Y represents a hydrolysable group independently selected from a halide group, an alkoxy group, an acyloxy group, and an aryloxy group, R represents hydrogen or an alkyl group of 1 to 4 carbon atoms whereby the R groups may be the same or different, z is 2, 3 or 4 and x is 0 or 1; and
   B. a substantial amount of one or more tetraalkoxysilanes.

2. A composition according to claim 1 wherein said component (B) further comprises a compound according to the formula:

$(R^2)_q M(Y^1)_{p-q}$ wherein $R^2$ represents a non-hydrolysable group, M represents an element selected from the group consisting of Si, Ti, Zr, B, Al, Ge, V, Pb, Sn and Zn, p is 3 or 4 depending on the valence of M, q is 0,1 or 2, and $Y^1$ represents a hydrolysable group.

3. The composition according to claim 2, wherein said compound $(R^2)_q M(Y^1)_{p-q}$ is a trialkoxy silane.

4. A composition according to claim 1 wherein said reaction product is a reaction product obtained from a substantially complete condensation reaction of said components (A) and (B) and further a crosslinking agent (C).

5. A composition according to claim 4 wherein the crosslinking agent (C) is a compound of an element $M^1$ that is selected from the group consisting of Si, Ti, Zr, B, Al, Ge, V, Pb, Sn and Zn, said crosslinking agent (C) further having at least one hydrolysable group and at feast one reactive functional group per molecule that is capable of engaging in a crosslinking reaction.

6. The composition according to claim 1, wherein the polyfluoropolyether segment includes perfluorinated repeating units selected from the group consisting of —(C$_2$F$_{2n}$O)—, —(CF(Z)O)—, —(CF(Z)C$_n$F$_{2n}$O)—, —(C$_n$F$_{2n}$CF(Z)O)—, —(CF$_2$CF(Z)O)—, and combinations thereof, wherein Z is a perfluoroalkyl group, an oxygen-substituted perfluoroalkyl group, a perfluoroalkoxy group, or an oxygen-substituted perfluoroalkoxy group, all of which can be linear, branched, or cyclic, and have 1 to 9 carbon atoms and 0 to 4 oxygen atoms and wherein n is a number from 1 to 12 inclusive.

7. The composition according to claim 1, wherein the weight ratio of component (A) to component (B) is 1:1 to 1:20.

8. A coating composition comprising 0.01 to 5 weight percent of the composition of claim 1 and an organic solvent.

9. A coated substrate comprising a coating derivable from the composition of claim 1.

10. Method of treating a substrate, comprising the steps of coating at least part of the surface of said substrate with a coating composition as defined in claim 1.

11. Method according to claim 10 wherein said substrate is glass, ceramic, metal or a polymeric substrate.

12. Method according to claim 10 wherein said method further involves the step of subjecting the coated substrate to an elevated temperature in the range of 40 to 400° C.

13. Process for the preparation of a perfluoropolyether condensation product, the process comprising the steps of admixing:
   A. at least one fluorochemical polyether silane compound of the formula:

$R_f$—[Q-CR$_2$Si(Y)$_{3-x}$(R$^1$)$_x$]$_z$ wherein $R_f$ represents a multivalent polyfluoropolyether segment, Q represents an organic divalent linking group, $R^1$ represents a $C_1$–$C_8$ alkyl group, Y represents a hydrolysable group independently selected from a halide group, an alkoxy group, an acyloxy group, and an aryloxy group, R represents hydrogen or an alkyl group of 1 to 4 carbon atoms whereby the R groups may be the same or different, z is 2, 3 or 4 and x is 0 or 1; and
   B. a substantial amount of one or more tetraalkoxysilanes; and
   C. optionally a crosslinking agent of an element $M^1$ that is selected from the group consisting of Si, Ti, Zr, B, Al, Ge, V, Pb, Sn and Zn, said crosslinking agent further having at least one hydrolysable group and at least one reactive functional group per molecule that is capable of engaging in a crosslinking reaction;
and reacting the components until substantial completion of the reaction is detected.

14. Process according to claim 13 wherein said components (A), (B) and optionally (C) are further admixed with water and an acid or base catalyst.

* * * * *

UNITED STATES PATENT AND TRADEMARK OFFICE
CERTIFICATE OF CORRECTION

PATENT NO.        : 7,097,910 B2
APPLICATION NO. : 10/701748
DATED              : August 29, 2006
INVENTOR(S)       : George G. I. Moore It is certified that error appears in the above-identified patent and that said Letters Patent is hereby corrected as shown below:

Col. 1
Line 6, delete "," and before "the".
Line 27, delete "RaMZb" and insert -- $R_aMZ_b$ --, therefor.
Line 39, delete "group-Containing" and insert -- group—containing --, therefor.
Line 40, delete "amino-group—Containing" and insert -- amino-group—containing --, therefor.
Line 45, delete "fluorine—Containing" and insert -- fluorine—containing --, therefor.

Col. 5
Line 16, delete "$SO_2NR_1'(CH_2)_KO(O)C\ CONR_1'(CH_2)_KO(O)C$" and
    insert -- —$SO_2NR_1'(CH_2)_KO(O)C$— —$CONR_1'(CH_2)_KO(O)C$— --, therefor.

Col. 14
Line 56, delete "$(C_{18}H_{37}N^+CH_3)_2$" and insert -- $C_{18}H_{37}N^+(CH_3)_2$ --, therefor.

Col. 17
Line 35, in Claim 1, delete "$R_f$—$[Q\text{-}CR_2Si(Y)_{3-x}(R^1)_x]_z$" and insert
    -- $R_f$—$[Q\text{-}CR_2\text{-}Si(Y)_{3-x}(R^1)_x]_z$ --, therefor.
Line 36, in Claim 1, delete "polyfluorepolyother" and insert
    -- polyfluoropolyether --, therefor.
Line 43, in Claim 1, delete "or1;" and insert -- or 1; --, therefor.

UNITED STATES PATENT AND TRADEMARK OFFICE
CERTIFICATE OF CORRECTION

| | |
|---|---|
| PATENT NO. | : 7,097,910 B2 |
| APPLICATION NO. | : 10/701748 |
| DATED | : August 29, 2006 |
| INVENTOR(S) | : George G. I. Moore |

It is certified that error appears in the above-identified patent and that said Letters Patent is hereby corrected as shown below:

<u>Col. 18</u>
Line 3, in Claim 5, delete "feast" and insert -- least --, therefor.
Line 9, in Claim 6, delete "—$(C_2F_{2n}O)$—," and insert -- —$(C_nF_{2n}O)$—, --, therefor.
Line 38, in Claim 13, delete "$R_f$—$[Q-CR_2Si(Y)_{3-x}(R^1)_x]_z$" and insert
-- $R_f$—$[Q-CR_2-Si(Y)_{3-x}(R^1)_x]_z$ --, therefor.

Signed and Sealed this

Eleventh Day of March, 2008

JON W. DUDAS
*Director of the United States Patent and Trademark Office*